United States Patent Office 3,442,907
Patented May 6, 1969

3,442,907
PROCESS FOR THE PREPARATION OF IMINO-DITHIOLANES
Alain Donche and Claude Thibault, Pau, France, assignors to Societe Nationale des Petroles, d'Aquitaine, Courbevoie, France
No Drawing. Filed Dec. 18, 1967, Ser. No. 691,204
Claims priority, application France, Dec. 20, 1966, 88,101
Int. Cl. C07d 71/00
U.S. Cl. 260—327                                      7 Claims

ABSTRACT OF THE DISCLOSURE

This invention has to do with a process for the preparation of imino-dithiolanes and, more particularly, the preparation of imino-dithiolanes, the nitrogen atom of which bears a hydrocarbyl radical, by heating hydrocarbyl-isothiocyanates with alkane-α-dithiols. The products are useful as sulfurizing agents and as nematocides.

Background of the invention

The imino-dithiolanes are heterocyclic compounds containing 2 sulfur atoms in a 5-element ring; they are useful industrially for various synthesis operations, and also, for example, as sulfurizing agents, particularly for the progressive and controlled sulfurization of metals or other materials. One of the uses of imino-dithiolanes is described in the Cannon et al. Patent No. 3,183,148 which deals with the control of nematocides and other parasitic worm life.

A substituted imino-dithiolane can be prepared by the action of phenyl-imino-phosgene on ethane-dithiol in a basic medium, this reaction resulting in phenyl-2-imino-1, 3-dithiolane with a yield of the order of 48% (V.S. Etlis and collaborators, J. Gen. Chem. USSR 1964, 34, 4076-79). However, this method of preparation made use of reactants which it was necessary to form in advance in a relatively difficult and expensive manner; phenyl-imino-phosgene can be prepared by the chlorination of phenyl-isothiocyanates, but this involves substantial losses. These and other difficulties experienced with the prior art devices have been obviated in a novel manner by the present invention.

It is, therefore, an outstanding object of the invention to provide a process for producing imino-dithiolanes by a reaction that does not require the presence of catalysts and that does not result in the production of thiazolidine as a by-product.

Another object of this invention is the provision of a process for the manufacture of 2-imino-1, 3-dithiolanes, wherein the nitrogen atom carries a hydrocarbyl substituent.

A further object of the present invention is the provision of a process for the manufacture of imino-dithiolanes which is relatively easy and inexpensive; the process is simple and can be carried out as an economic industrial process giving good yields and starting with initial materials which can be relatively easily obtained.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

Summary of the invention

In general, the invention has to do with a process for preparing a 2-imino-1, 3-dithiolane, the nitrogen atom of which has its hydrogen replaced by a hydrocarbyl radical, which process consists in heating a hydrocarbyl-isothiocyanate, the hydrocarbyl of which has 1 to 30 carbon atoms, with an alkane-α-dithiol having 2 to 12 carbon atoms, the temperature of heating at a temperature in the range from 100° to 200° C.

Description of the preferred embodiment

The process of the invention comprises causing an organic isothiocyanate to react under heat with an alkane-α-dithiol. The reaction can be represented in the following manner:

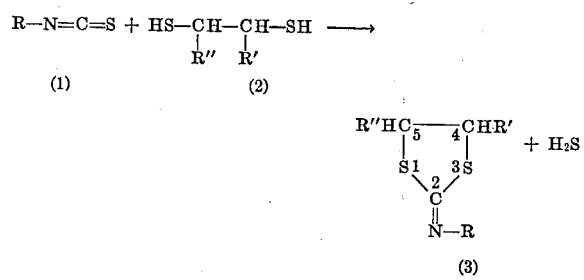

The radical R in the isothiocyanate (1) can be the same as one or both of the radicals R' and R" of the alkane-α-dithiol (2), or different; R' and R" can be the same or different. Thus, in the 2-R-imino-4-R'-5-R"-1, 3-dithiolane (3) which is obtained, the radicals R, R' and R" can be different, or two or all three of them can be the same.

However, while R' and R" can be hydrogen atoms, corresponding to the preparation from ethane-dithiol, of 2-imino-1, 3-dithiolane substituted on the nitrogen, R is always a hydrocarbyl radical in the formula

The most usual alkane-α-dithiols have an entirely aliphatic chain comprising 2 to 12 carbon atoms, that is to say, the most usual homologues are those from ethane-dithiol up to the dodecane-α-dithiol.

In general, the process of the invention can be carried out with organic isothiocyanates in which R is a radical such as alkyl, aryl, aralkyl, alkaryl and/or cycloalkyl. The isothiocyanates which are particularly suitable are the linear or branched alkyl isothiocyanates having from 1 to 30 carbon atoms in the molecule, and particularly, from 1 to 6 carbon atoms, namely: methyl, ethyl, propyl, isopropyl, butyl, isobutyl, tert.-butyl, pentyls and hexyls.

As regards the aryl isothiocyanates which can be used according to the invention, their aromatic nucleous, which may be benzene or some other nucleus, can carry electropositive or electronegative substituents, for example, alkyls such as methyl, ethyl, isopropyl, hexyls or dodecyls, halogens, in particular chlorine, or groups such as nitro, or sulfo. The process can thus be carried out with phenyl, methylphenyl, dimethylphenyl, ethylphenyl, butylphenyl, decylphenyl or naphthyl isocyanates, for example. It is, likewise, possible to employ cycloalkyl isothiocyanates, in particular cyclohexyl or cyclopentyl isothiocyanates, which may be substituted.

The process according to the invention is capable of being effected quickly with good yields and without a catalyst. The heating temperature of the reaction medium is then generally of the order of 100° to 200° C., and particularly from 130° to 170° C.

Another advantage of the process of the invention resides in that the desired imino-dithiolane is obtained in a suitable state of purity, practically free from thiazolidines, thus avoiding separating operations.

Although it is possible to employ stoichiometric proportions of the reactants, it is of advantage to have a certain excess of alkane-dithiol with respect to the isothiocyanate in the reaction mixture. In view of the ease with which the dithiol can be recycled, the use of an excess of this substance does not cause any complication. The preferred proportions are from 1 to 3 mols, and particularly about 2 mols of alkane-α-dithiol to 1 mol of organic isothiocyanate.

The invention is illustrated by the following example which does not limit it in any way.

Example 13.5 g. of phenyl isothiocyanate $C_6H_5-N=C=S$, that is to say 0.1 mol is mixed with 18.8 g. of ethane-dithiol $HS-CH_2-CH_2-SH$, that is to say 0.2 mol and kept at 150° C. for 15 minutes. The crude product obtained is dissolved in 250 ml. of ether and washed twice with 50 ml. of hydrochloric acid containing 18% by weight of HCl. The ethereal phase is concentrated and distilled so as to recover the excess ethane-dithiol.

The aqueous phase is treated in the cold with 20% sodium hydroxide until it is alkaline; the imino-dithiolane is extracted therefrom with ether and then, after drying and evaporating the solvent, the product remaining is distilled in vacuo; 15.6 g. of phenyl-2-imino-1, 3-dithiolane

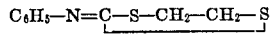

melting at 45° C. are collected, this representing a yield of 80% with respect to the phenyl isothiocyanate initially used.

It is to be noted that the method starting with phenyl-imino-phosgene referred to above only gives a yield of about 48%.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for preparing a 2-imino-1, 3-dithiolane the nitrogen atom of which has its hydrogen replaced by a hydrocarbyl radical, which consists in heating at a temperature of 100° to 200° C. a hydrocarbyl-isothiocyanate the hydrocarbyl of which has 1 to 30 carbon atoms, with an alkane-α-dithiol having 2 to 12 carbon atoms.

2. A process as recited in claim 1, wherein the hydrocarbyl of said isothiocyanate is selected from the group consisting of alkyls, aryls, alkaryls, aralkyls and cycloalkyls.

3. A process as recited in claim 1, wherein the hydrocarbyl of said isothiocyanate is an alkyl having 1 to 6 carbon atoms.

4. A process as recited in claim 1, wherein the hydrocarbyl of said isothiocyanate is phenyl.

5. A process for preparing alkyl-2-imino-1, 3-dithiolane, which consists in heating at 130° to 170° C. one to three moles of ethane-dithiol with one mole of an alkyl-isothiocyanate the alkyl of which has 1 to 6 carbon atoms until a substantial amount of the dithiolane is formed, and separating the dithiolane from the reaction mixture obtained.

6. A process for preparing phenyl-2-imino-1, 3-dithiolane, which consists in heating at 130° to 170° C. one to three moles of ethane-dithiol with one mole of phenyl-isothiocyanate until a substantial amount of the dithiolane is formed, and separating the dithiolane from the reaction mixture obtained.

7. A process as recited in claim 6, wherein said separating comprises the steps of: dissolving said reaction mixture in ether; washing the etheral solution thus formed with aqueous acid solution; separating the aqueous acid solution and treating it with a base until it becomes basic; extracting the dithiolane from the basic solution by means of ether; separating the ethereal phase thus obtained, evaporating the ether, and distilling in vacuo the product which remains after the evaporation of ether.

References Cited

UNITED STATES PATENTS 3,364,230   1/1968   Addor _____ 260—327

JAMES A. PATTEN, *Primary Examiner.*